(12) United States Patent
Kadokawa

(10) Patent No.: US 8,888,617 B2
(45) Date of Patent: Nov. 18, 2014

(54) BELT TYPE CONTINUOUSLY VARIABLE TRANSMISSION

(75) Inventor: Masanori Kadokawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/696,393

(22) PCT Filed: May 26, 2010

(86) PCT No.: PCT/JP2010/058914
§ 371 (c)(1),
(2), (4) Date: Nov. 6, 2012

(87) PCT Pub. No.: WO2011/148474
PCT Pub. Date: Dec. 1, 2011

(65) Prior Publication Data
US 2013/0059684 A1    Mar. 7, 2013

(51) Int. Cl.
*F16H 55/56* (2006.01)
*F16H 9/18* (2006.01)
*F16H 57/035* (2012.01)

(52) U.S. Cl.
CPC *F16H 9/18* (2013.01); *F16H 55/56* (2013.01); *F16H 57/035* (2013.01)
USPC .......................................................... 474/8

(58) Field of Classification Search
CPC .............. F16H 55/56; F16H 9/16; F16H 9/18
USPC ........................................................... 474/8
See application file for complete search history.

(56) References Cited

U.S. PATENT DOCUMENTS

| | | | | |
|---|---|---|---|---|
| 2,110,864 A | * | 3/1938 | Batesole ....................... | 384/477 |
| 2,150,796 A | * | 3/1939 | Brouwer et al. .............. | 384/498 |
| 2,443,501 A | * | 6/1948 | Greenlee ....................... | 384/537 |
| 2,529,743 A | * | 11/1950 | Harris et al. .................. | 474/14 |
| 3,071,079 A | * | 1/1963 | Henyon ........................ | 418/188 |
| 3,608,685 A | * | 9/1971 | Childress ....................... | 192/94 |
| 3,721,780 A | * | 3/1973 | Kelly et al. ..................... | 200/47 |
| 4,270,412 A | * | 6/1981 | Beijer et al. ................... | 475/331 |
| 4,440,042 A | * | 4/1984 | Holdeman ..................... | 475/269 |
| 4,518,372 A | * | 5/1985 | Dye ............................... | 474/94 |

(Continued)

FOREIGN PATENT DOCUMENTS

| | | |
|---|---|---|
| EP | 0 658 709 A1 | 6/1995 |
| EP | 1 582 768 A | 10/2005 |

(Continued)

*Primary Examiner* — Henry Liu
(74) *Attorney, Agent, or Firm* — Finnegan, Henderson, Farabow, Garrett & Dunner, LLP

(57) ABSTRACT

With respect to a belt type continuously variable transmission in which a belt is wound around between a primary pulley and a secondary pulley, each of which includes a stationary sheave and a movable sheave, and a transmission is carried out by forwardly and backwardly moving the movable sheave with respect to the stationary sheave, a boss portion that protrudes in an axial direction is integrally formed with the stationary sheave of the secondary pulley, and a parking gear is provided on the outer circumferential side of the boss portion. Further, the configuration to hold the bearing is achieved using the inner circumferential portion of the boss portion integrally formed with the stationary sheave, that is, the inner circumferential portion of the parking gear so as to shorten the axial length of the secondary shaft, whereby achieving cost reduction.

3 Claims, 8 Drawing Sheets

(56) References Cited

U.S. PATENT DOCUMENTS

| | | | |
|---|---|---|---|
| 4,580,323 A * | 4/1986 | Pochon et al. | 492/1 |
| 4,730,517 A * | 3/1988 | Hamano et al. | 475/304 |
| 4,875,786 A * | 10/1989 | DeWachter | 384/482 |
| 4,913,688 A * | 4/1990 | Bekheet | 474/170 |
| 4,930,618 A * | 6/1990 | Roh | 198/781.02 |
| 5,361,744 A * | 11/1994 | Teraoka | 123/561 |
| 5,480,361 A * | 1/1996 | Murakami et al. | 475/328 |
| 5,527,226 A | 6/1996 | Lamers | |
| 5,649,456 A * | 7/1997 | Mochizuki | 74/606 R |
| 5,792,020 A * | 8/1998 | Kikuchi et al. | 475/346 |
| 6,155,126 A * | 12/2000 | Vogt et al. | 74/335 |
| 6,241,635 B1 | 6/2001 | Schmid et al. | 474/11 |
| 6,336,878 B1 * | 1/2002 | Ehrlich et al. | 474/28 |
| 6,406,390 B1 * | 6/2002 | Roby | 474/14 |
| 6,421,903 B2 * | 7/2002 | Brown | 29/428 |
| 6,565,465 B2 * | 5/2003 | Nishigaya et al. | 474/28 |
| 6,712,724 B2 * | 3/2004 | Katou | 474/28 |
| 7,217,204 B2 * | 5/2007 | Roby | 474/14 |
| 7,708,660 B2 | 5/2010 | Kuwabara et al. | |
| 7,753,814 B2 * | 7/2010 | Nozawa et al. | 474/28 |
| 2001/0044349 A1 * | 11/2001 | Tanigawa et al. | 474/8 |
| 2001/0044350 A1 * | 11/2001 | Nishigaya et al. | 474/18 |
| 2001/0049312 A1 * | 12/2001 | Warner et al. | 474/18 |
| 2004/0033851 A1 * | 2/2004 | Lubben | 474/8 |
| 2004/0259671 A1 * | 12/2004 | Gieles | 474/37 |
| 2005/0197221 A1 * | 9/2005 | Nozawa et al. | 474/18 |
| 2005/0233841 A1 * | 10/2005 | Matsubara et al. | 474/8 |
| 2005/0233842 A1 * | 10/2005 | Shioiri et al. | 474/19 |
| 2005/0233847 A1 * | 10/2005 | Kuroda | 474/50 |
| 2006/0019781 A1 * | 1/2006 | Roby | 474/8 |
| 2006/0070839 A1 | 4/2006 | Sugano et al. | |
| 2007/0249440 A1 * | 10/2007 | Nozawa et al. | 474/28 |
| 2008/0190673 A1 * | 8/2008 | Sugitani et al. | 180/54.1 |
| 2009/0280936 A1 * | 11/2009 | Appleton et al. | 474/8 |
| 2011/0153174 A1 * | 6/2011 | Roberge et al. | 701/58 |

FOREIGN PATENT DOCUMENTS

| | | |
|---|---|---|
| EP | 1 643 169 A2 | 4/2006 |
| JP | 3-168452 | 7/1991 |
| JP | 4-203547 | 7/1992 |
| JP | 6-16752 | 3/1994 |
| JP | 7-198010 | 8/1995 |
| JP | 10-246298 | 9/1998 |
| JP | 2001-330096 | 11/2001 |
| JP | 2005-291319 | 10/2005 |
| JP | 2005-344743 | 12/2005 |
| JP | 2006-103398 | 4/2006 |
| JP | 2008-232389 | 10/2008 |

* cited by examiner

PRIOR ART

BELT TYPE CONTINUOUSLY VARIABLE TRANSMISSION

CROSS-REFERENCE TO RELATED APPLICATIONS

This application is a national phase application of International Application No. PCT/JP2010/058914, filed May 26, 2010, the content of which is incorporated herein by reference.

TECHNICAL FIELD

The present invention relates to a belt type continuously variable transmission mounted in a vehicle and the like.

BACKGROUND ART

With respect to a vehicle in which an engine is mounted, there has been known an automatic transmission that automatically, optimally sets a transmission ratio between the engine and driving wheels, as a transmission to appropriately transmit torque and revolution generated by the engine to the driving wheels in accordance with driving conditions for the vehicle.

There has been known a belt type continuously variable transmission (CVT: Continuously Variable Transmission) that continuously adjusts the transmission ratio as an automatic transmission mounted in the vehicle and the like (for example, see patent document 1 and patent document 2).

FIG. 9 shows one example of a belt type continuously variable transmission. The belt type continuously variable transmission 500 of this example includes a primary pulley 501 on an input side thereof, a secondary pulley 502 on an output side thereof, and a belt 503 around which the primary pulley 501 and the secondary pulley 502 are wound.

The primary pulley 501 is a variable pulley whose effective diameter is variable, and is constituted of a stationary sheave 511 integrally provided with a primary shaft 510, and a movable sheave 512 that is arranged slidably only in the axial direction of the primary shaft 510. Similarly, the secondary pulley 502 is a variable pulley whose effective diameter is variable and is constituted of a stationary sheave 521 integrally provided with a secondary shaft 520, and a movable sheave 522 that is arranged slidably only in the axial direction of the secondary shall 520.

On the side of the movable sheave 512 of the primary pulley 501, there is provided an oil actuator 513 to change a V-groove width between the stationary sheave 511 and the movable sheave 512. Also, on the side of the movable sheave 522 of the secondary pulley 502, there is provided an oil actuator 523 to change a V-groove width between the stationary sheave 521 and the movable sheave 522.

With respect to the belt type continuously variable transmission 500 of the configuration described above, by controlling oil pressure of the oil actuator 513 of the primary pulley 501, each V-groove width of the primary pulley 501 and the secondary pulley 502 is varied, and a winding diameter (effective diameter) of the belt 503 is varied, whereby successively changing the transmission ratio. Also, the oil pressure of the oil actuator 523 of the secondary pulley 502 is controlled in such a manner that the belt 503 is clamped under predetermined clamping pressure that does not cause belt slippage.

In a belt type continuously variable transmission 4 shown in FIG. 9, the primary shaft 510 is rotatably supported by two bearings 541 and 542. The bearing 541 on the outer side of the stationary sheave 511, out of the two bearings 541 and 542, is held by a transaxle case 506, and the bearing 542 on the outer side of the movable sheave 512 is held by a transaxle rear cover 507.

Also, one end portion of the secondary shaft 520 is rotatably supported by a bearing 551 held by the transaxle rear cover 507 on the outer side with respect to the stationary sheave 521, and the other end portion of the secondary shaft 520 is rotatably supported by a bearing 522 disposed on the outer side with respect to the movable sheave 522. Further, in the stationary sheave 521 of the secondary pulley 502, a parking gear 508 is integrally provided at the outer circumferential portion on the side of the bearing 551.

RELATED ART DOCUMENTS

Patent Documents

Patent document 1: Japanese Unexamined Patent Application Publication No. 2008-232389.
Patent document 2: Japanese Unexamined Patent Application Publication No. 2005-344743.

SUMMARY OF THE INVENTION

Problems to be Solved by the Invention

Incidentally, with respect to the conventional belt type continuously variable transmission of the configuration shown in FIG. 9, the parking gear (508) and the bearing (551) are laterally arranged (arranged side by side in the axial direction), so that the parking gear and the bearing independently exist. Accordingly, the length (axial length) of the secondary shaft is required to be longer in accordance with the width of the bearing and the parking gear. Thus, as for the conventional belt type continuously variable transmission, the axial length of the secondary shaft becomes longer, which contributes to impediment to cost reduction.

With respect to the belt type continuously variable transmission, as a method of shortening the axial length of the shaft, it is assumed that the thickness of each component constituting the transmission is reduced. However, in this case, the function or intensity of the transmission is reduced, so this measure cannot be acceptable.

The present invention has been achieved in view of the above circumstances, it is an object of the present invention to provide a belt type continuously variable transmission in which a belt is wound around between a primary pulley and a secondary pulley, each of which includes a stationary sheave and a movable sheave, and a transmission ratio is continuously adjusted by forwardly and backwardly moving the movable sheave with respect to the stationary sheave, whereby providing the structure in which the axial length of a shaft can be shortened.

Means of Solving the Problems

According to one aspect of the present invention, it is presupposed that a belt type continuously variable transmission may be configured such that a belt is wound around between a primary pulley and a secondary pulley, each of which includes a stationary sheave and a movable sheave, and a rotational force of the primary pulley on a drive side can be transmitted to the secondary pulley on a driven side via the belt, and a winding position of the belt in a radial direction of each pulley is varied by forwardly and backwardly moving the movable sheave with respect to the stationary sheave so as to adjust a transmission ratio, the belt type continuously variable transmission. It is characterized that the belt type continuously variable transmission includes a bearing configured to rotatably support the stationary sheave of the secondary pulley, wherein the stationary sheave of the secondary pulley includes a boss portion (cylindrically shaped member) that protrudes in an axial direction thereof (protrudes on the opposite side with respect to the movable sheave), and a parking gear is provided on an outer circumferential side of the boss portion, and an outer race is provided on an inner circumferential side of the boss portion.

With another aspect of the present invention, a concrete configuration may be exemplified such that an outer circumferential surface of the outer race of the bearing abuts on an inner circumferential surface of the boss portion, and the stationary sheave of the secondary pulley is supported by the bearing via the boss portion.

With the aspect of the present invention, it is configured to hold the bearing with the inner circumferential portion of the boss portion formed with the stationary sheave of the secondary pulley, that is, the inner circumferential portion of the parking gear, so that the parking gear and the bearing can be longitudinally arranged (arranged in a direction crossing at right angle with the shaft), and the axial length of the secondary shaft can be shortened. Moreover, according to the present invention, the outer race of the bearing is disposed at the outer circumferential portion of the sheave surface (slant on which the belt abuts) of the stationary sheave of the secondary pulley, whereby increasing rigidity against the tilt of the sheave surface. Accordingly, the rigidity (sheave thickness) of the stationary sheave can be decreased, compared with that of the conventional stationary sheave, so that the axial length of the shaft can be shortened as much.

According to another aspect of the present invention, for example, a snap ring is used as a means for regulating the transfer of the bearing disposed in the boss portion of the stationary sheave in the axial direction. A concrete configuration may be exemplified such that a ring groove is formed on the outer circumferential side of the outer race of the bearing, and a ring groove is formed on the inner circumferential side of the boss portion of the stationary sheave, and the snap ring is fitted into the two ring grooves so as to regulate the transfer of the bearing (outer race) in the axial direction. Also, the configuration may be exemplified such that a ring groove is formed at a position that corresponds to a side-end surface of the outer race on the inner circumferential side of the boss portion of the stationary sheave, and the snap ring is fitted into the ring groove of the boss portion, and the snap ring is placed on the side-end surface of the outer race so as to regulate the transfer of the bearing (outer race) in the axial direction.

Also, another configuration to regulate the transfer of the bearing in the axial direction may be exemplified such that a stopper plate is fixed on a tip-end surface of the boss portion that protrudes from the stationary sheave, and the transfer of the bearing (outer race) in the axial direction is regulated by the stopper plate.

Effects of the Invention

According to the aspect of the present invention, it is configured to hold a bearing with an inner circumferential portion of a parking gear integrally formed with a stationary sheave of a secondary pulley, so that the entire length (axial length) of a secondary shaft can be shortened, whereby achieving cost reduction.

MODES FOR CARRYING OUT THE INVENTION

Hereinafter, embodiments of the present invention will be described below with reference to the drawings.

First Embodiment

Entire Configuration of Transaxle

First, the entire configuration of a transaxle in which a belt type continuously variable transmission according to the present invention is mounted will be described.

Figure 1:
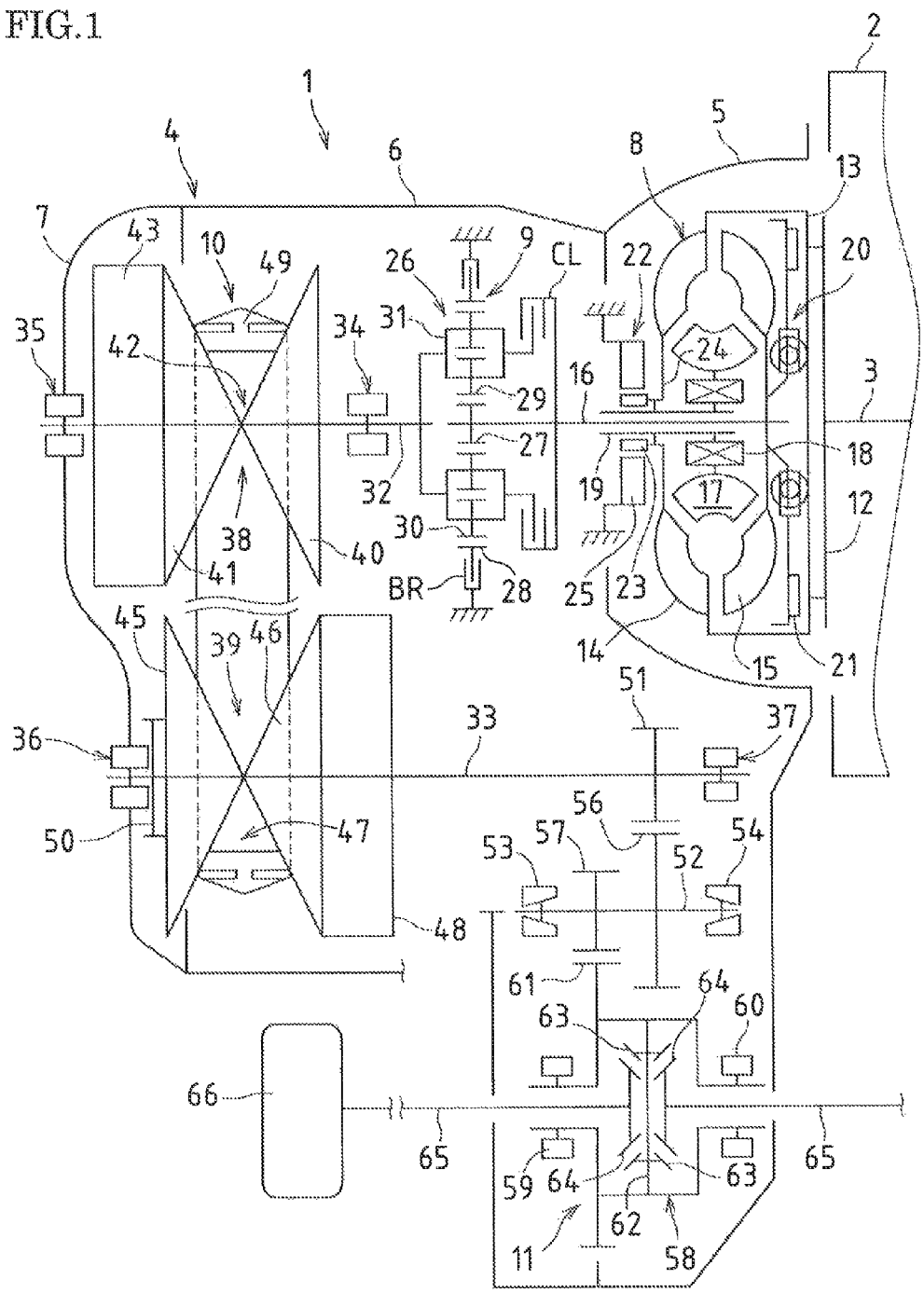
FIG. 1 is a skeleton diagram of a transaxle including a belt type continuously variable transmission of the present invention.

FIG. 1 is a skeleton diagram of a transaxle in which a belt type continuously variable transmission of the present embodiment is applied to a vehicle 1 of an FF type (front engine and front drive). The types of an engine 2 mounted in the vehicle 1 of this example are not limited. In the description below, the case in which a gasoline engine is applied as an engine 2 will be described.

A transaxle 4 is provided on the output side of the engine 2. The transaxle 4 includes a transaxle housing 5 attached on the rear end side of the engine 2, a transaxle case 6 attached to the transaxle housing 5, a transaxle rear cover 7 that covers an opening portion of the transaxle case 6, and the like.

A torque converter 8 is provided in the inside of the transaxle housing 5. Also, an input shaft 16 is provided on the same axial line as that of a crank shaft 3. A turbine runner 15 of the torque converter 8 is attached to an end portion of the side of the engine 2 with respect to the input shaft 16.

A forwarding/reversing switching mechanism 9, a belt type continuously variable transmission (CVT) 10, a final reducer 11, and the like are provided in the inside of the transaxle case 6 and the transaxle rear cover 7.

A front cover 13 is connected to an end portion of the crank shaft 3 of the engine 2 via a drive plate 12, and a pump impeller 14 of the torque converter 8 is connected to the front cover 13. The pump impeller 14 and the turbine runner 15 are disposed opposite to each other, and a stator 17 is disposed in the inside of the pump impeller 14 and the turbine runner 15.

The rotational direction of the stator 17 is regulated in one direction only by means of a one-way clutch 18.

Also, an oil pump 22 is provided between the torque converter 8 and the forwarding/reversing switching mechanism 9. The oil pump 22 includes a rotor 23, and the rotor 23 is connected to the pump impeller 14 through a hub 24. The hub 24 is splined to a hollow shaft 19, and a body 25 of the oil pump 22 is fixed on the side of the transaxle case 6. Accordingly, the driving force of the engine 2 is transmitted to the rotor 23 via the pump impeller 14, whereby driving the oil pump 22.

With respect to the operation of the torque converter 8, the pump impeller 14 rotates via the drive plate 12 and the front cover 13, in accordance with the rotation of the crank shaft 3 based on the drive of the engine 2, and the turbine runner 15 starts rotating, as if being dragged, by the flow of operational oil supplied from the oil pump 22. When the difference in the rotational speed between the pump impeller 14 and the turbine runner 15 is large, the stator 17 alternates the flow of the operational oil in a direction that the rotation of the pump impeller 14 is assisted.

Then, after the vehicle 1 starts moving, and when the vehicle speed reaches a predetermined speed, a lock-up clutch 21 activates. Thereupon, a driving force transmitted from the engine 2 to the front cover 13 is mechanically and directly transmitted to the input shaft 16. It is noted that variation in the torque transmitted from the front cover 13 to the input shaft 16 is absorbed by a damper 20.

The forwarding/reversing switching mechanism 9 is provided in a driving force transmission path between the input shaft 16 and the belt type continuously variable transmission 10. The forwarding/reversing switching mechanism 9 includes a double pinion type planetary gear mechanism 26.

The planetary gear mechanism 26 includes a sun gear 27 provided in the input shaft 16, a ring gear 28 disposed concentrically with the sun gear 27 on the outer circumferential side of the sun gear 27, an inner-side pinion gear 29 that is engaged with the sun gear 27, an outer-side pinion gear 30 that is engaged with the ring gear 28 and the inner-side pinion gear 29, and a carrier 31 that rotatably supports the two pinion gears 29 and 30 and integrally, rotatably holds the pinion gears 29 and 30 in the periphery of the sun gear 27. Then, the carrier 31 is connected to a primary shaft 32 of the belt type continuously variable transmission 10, which is described later.

Also, in the planetary gear mechanism 26, there are provided a forward clutch CL that connects and disconnects the driving force transmission path between the carrier 31 and the input shaft 16, and a reverse brake BR that controls the rotation and the fixation of the ring gear 28 respectively. It is configured that the driving force transmission path can be changed by controlling the engagement and release of the forward clutch CL and the reverse brake BR so as to switch a forward rotational driving force (positive rotational direction) and a backward rotational driving force (reverse rotational direction).

Specifically, when the forward clutch CL is engaged, and the reverse brake BR is released, the forwarding/reversing switching mechanism 9 is put into an integrally rotatable state so as to accomplish (achieve) a forward driving three transmission path in this state, the driving force of the forward direction is transmitted to the side of the belt type continuously variable transmission 10. In contrast, when the reverse brake BR is engaged, and the forward clutch CL is released, a reversing driving force transmission path is accomplished (achieved) by the forwarding/reversing switching mechanism 9. In this state, the primary shaft 32 of the belt type continuously variable transmission 10 rotates in the reverse direction with respect to the input shaft 16, and the driving force of the reversing direction is transmitted to the side of the belt type continuously variable transmission 10. Also, when the forward clutch CL and the reverse brake BR are both released, a forwarding/reversing switching device 3 is put into a neutral position (disconnected state) to disconnect the transmission of driving force.

The belt type continuously variable transmission 10 includes a primary shaft (drive side shaft) 32 disposed on the same axial line as that of the input shaft 16, and a secondary shaft (driven side shaft) 33 disposed parallel to the primary shaft 32. The primary shaft 32 is rotatably supported by two bearings 34 and 35. A primary pulley (drive side pulley) 38 is provided on the side of the primary shaft 32, and a secondary pulley (driven side pulley) 39 is provided on the side of the secondary shaft 33.

The primary pulley 38 includes a stationary sheave 40 that is integrally formed with the primary shaft 32, and a movable sheave 41 that is configured to be movable in the axial direction of the primary shaft 32. Then, there is formed a pulley groove (V-groove) 42 between the opposite surfaces of the stationary sheave 40 and the movable sheave 41. Also, the movable sheave 41 is displaced in the axial direction of the primary shaft 32 so as to provide a cylinder member (hydraulic actuator) 43 that sets the stationary sheave 40 and the movable sheave 41 apart/close to each other.

In contrast, the secondary pulley 39 also includes a stationary sheave 45 that is integrally formed with the secondary shaft 33, and a movable sheave 46 that is configured to be movable in the axial direction of the secondary shaft 33. There is formed a pulley groove (V-groove) 47 between the opposite surfaces of the stationary sheave 45 and the movable sheave 46. Further, the movable sheave 46 is displaced in the axial direction of the secondary shaft 33 so as to provide a cylinder member (hydraulic actuator) 48 that sets the stationary sheave 45 and the movable sheave 46 apart/close to each other.

Then, a belt 49 is wrapped around the pulley groove 42 of the primary pulley 38 and the pulley groove 47 of the secondary pulley 39. For example, the belt 49 includes a plurality of metallic pieces (also referred to as elements or blocks) and a plurality of rings made of steel and the like (also referred to as hoops or bands), which is configured as a so-called push-type metal belt (for example, see Japanese Unexamined Patent Application Publication No, 2000-220697, 2002-257200, and the like).

The end portion of the secondary shaft 33 (the end portion of the side of the movable sheave 46) is rotatably supported by the bearing 37. Also, the stationary sheave 45 that is integrally formed with the secondary shaft 33 is rotatably supported by the bearing 36. Further, a counter drive gear 51 is fixed on the secondary shaft 33. Also, a parking gear 50 is integrally formed with the stationary sheave 45 of the secondary pulley 39. The bearing 36 to support the parking gear 50 and the stationary sheave 45 of the secondary shaft 33 will be described in detail later.

On the driving force transmission path between the counter drive gear 51 and the final reducer 11, an intermediate shaft 52 parallel to the secondary shaft 33 is arranged while being supported by two bearings 53 and 54. A counter driven gear 56, which engages with the counter drive gear 51, and a final drive gear 57 are provided for the intermediate shaft 52.

The final reducer 11 includes a hollow differential case 58 that is rotatably supported by the bearings 59 and 60. A ring gear 61 that engages with the final drive gear 57 is provided on the outer circumference of the differential case 58. Then, a pinion shaft 62 to which two pinion gears 63 are attached is disposed in the inside of the differential case 58. Two side gears 64 are engaged with the pinion gears 63 and connected to a driving wheel 66 via right-and-left drive shafts 65.

Configurations of Primary Pulley and Secondary Pulley

Figure 2:
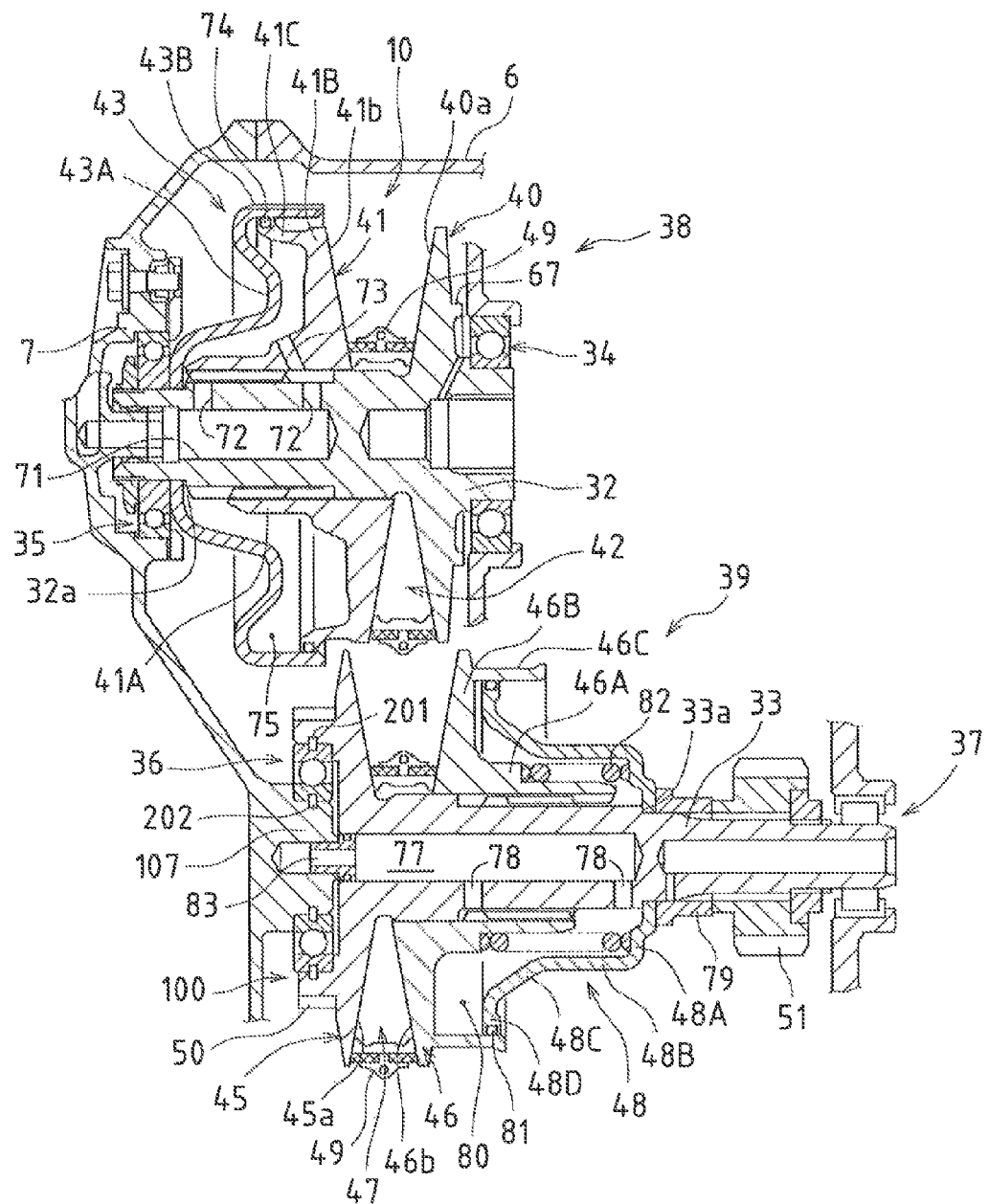
FIG. 2 is a cross-sectional view of a main part of the belt type continuously variable transmission of FIG. 1.

Next, the concrete configuration of the belt type continuously variable transmission 10 described above will be described with reference to FIG. 2. FIG. 2 is an enlarged cross-sectional view of a main portion of the belt type continuously variable transmission 10. In FIG. 2, the primary shaft 32 can rotate about the axis thereof as a center, and the stationary sheave 40 is integrally formed with one end of the primary shaft 32. It is noted that the stationary sheave 40 and the primary shaft 32 may be configured as a separate member, and the stationary sheave 40 may be integrally provided at an end portion of the primary shaft 32.

Also, as is described above, the primary shaft 32 is rotatably supported by the two bearings 34 and 35. The bearing 34 on the outer side of the stationary sheave 40, out of the two bearings 34 and 35, is supported by the transaxle case 6. Also, the bearing 35 on the outer side of the movable sheave 41 is supported by the transaxle rear cover 7.

Also, an oil path 71 is formed in the axial direction in the inside of the primary shaft 32, and the oil path 71 communicates with a hydraulic circuit of a hydraulic control device that is not shown. Also, in the primary shaft 32, there is formed an oil path 72 that penetrates in the radial direction toward the outer circumferential surface of the primary shaft 32 and communicates with the oil path 71.

The movable sheave 41 includes an inner cylinder 41A that is movable along the outer circumferential surface of the primary shaft 32, a radial portion 41B that is successively formed from the inner cylinder 41A to the outward radial direction of the primary shaft 32, and an outer cylinder 41C that is successively disposed at the outer circumferential end of the radial portion 41B and extends along the axial direction of the primary shaft 32 from the outer circumferential end of the radial portion 41B to the cylinder member 43.

Also, an oil path 73 that penetrates from the inner circumferential surface to the outer circumferential surface of the inner cylinder 41A is formed in the inner cylinder 41A of the movable sheave 41. The oil path 73 and the oil path 72 are communicated through a spline portion formed on the outer circumferential surface of the primary shaft 32.

That is, the inner cylinder 41A of the movable sheave 41 and the primary shaft 32 are splined, and the primary shaft 32 and the movable sheave 41 are relatively, smoothly movable in the axial direction. However, the primary shaft 32 and the movable sheave 41 are connected in such a manner that the primary shaft 32 and the movable sheave 41 are not relatively displaced in the circumferential direction.

Sheave surfaces (slant) 40a and 41b are formed on the opposite surfaces of the stationary sheave 40 and the radial portion 41B of the movable sheave 41 respectively. The pulley groove (V-groove) 42 is formed by the sheave surfaces 40a and 41b, and the belt 49 is wound around the pulley groove 42.

The cylinder member 43 is provided on the back surface on the opposite side of the sheave surface 41b of the movable sheave 41. The cylinder member 43 includes a radial portion 43A that extends from the outer circumferential portion of the primary shaft 32 between the bearing 35 and the movable sheave 41 to the outward radial direction of the primary shaft 32, and an outer cylinder 43B that extends from the external end of the radial portion 43A to the side of the stationary sheave 40 along the axial direction of the primary shaft 32. There is formed a cylinder chamber 75 between the cylinder member 43 and the back surface of the movable sheave 41. It is noted that the inner edge portion of the radial portion 43A of the cylinder member 43 is sandwiched between the bearing 35 and a step portion 32a of the primary shaft 32, whereby positioning and fixing the primary shaft 32.

A seal member 74 that slidably abuts on the inner circumferential surface of the outer cylinder 43B of the cylinder member 43 is fitted into the outer cylinder 41C of the movable sheave 41. When the movable sheave 41 transfers along the axial direction of the primary shaft 32, the outer cylinder 41C is configured to slide along the inner circumferential surface of the outer cylinder 43B via the seal member 74.

In the above configuration, the operational oil is supplied from the hydraulic circuit of the hydraulic control device into the cylinder chamber 75 via the oil paths 71, 72, and 73 so as to control operational oil pressure in the cylinder chamber 75. The movable sheave 41 is transferred with respect to the stationary sheave 40 so as to change the winding radius of the belt 49, whereby successively adjusting the transmission ratio of the belt type continuously variable transmission 10.

In contrast, the secondary shaft 33 is disposed parallel to the primary shaft 32. The stationary sheave 45 is integrally formed with one end of the secondary shaft 33. Also, the movable sheave 45 that is configured to be movable in the axial direction thereof is provided for the secondary shaft 33. Then, as described above, the end portion of the secondary shaft 33 (end portion on the side of the movable sheave 46) is rotatably supported by the bearing 37. Also, the stationary sheave 45 integrally formed with the secondary shaft 33 is rotatably supported by the bearing (bail bearing) 36. It is noted that the stationary sheave 45 and the secondary shaft 33 may be configured as a separate member, and the stationary sheave 45 may be integrally provided at the end portion of the secondary shaft 33.

An oil path 77 is formed in the axial direction in the inside of the secondary shaft 33. The oil path 77 communicates with the hydraulic circuit of a clamping pressure control device to control the clamping pressure of the belt 49 not shown. Also, in the secondary shaft 33, there is formed an oil path 78 that extends in the outward radial direction of the secondary shaft 33, and the oil path 78 communicates with the oil path 77. It is noted that a sleeve 83 to be sealed is attached to an end portion of the oil path 77.

The movable sheave 46 includes an inner cylinder 46A that is movable along the outer circumferential surface of the secondary shaft 33, a radial portion 46B that is successively formed from the inner cylinder 46A to the outward radial direction of the secondary shaft 33, and an outer cylinder 46C that is successively disposed at the outer circumferential end of the radial portion 46B and extends along the axial direction of the secondary shaft 33 from the outer circumferential end of the radial portion 46B to the counter driven gear 51.

The inner cylinder 46A of the movable sheave 46 and the secondary shaft 33 are splined, and the secondary shaft 33 and the movable sheave 46 are relatively, smoothly movable in the axial direction. However, the secondary shaft 33 and the movable sheave 46 are connected in such a manner that the secondary shaft 33 and the movable sheave 46 are not relatively displaced in the circumferential direction.

Sheave surfaces (slant) 45a and 46b are formed on the opposite surfaces of the stationary sheave 45 and the radial portion 46B of the movable sheave 46 respectively. The pulley groove (V-groove) 47 is formed by the sheave surfaces 45a and 46b, and the belt 49 is wound around the pulley groove 47.

The cylinder member 48 is provided on the back surface on the opposite side of the sheave surface 46b of the movable sheave 46. The cylinder member 48 includes a first radial portion 48A that extends in the outward radial direction of the secondary shaft 33, a cylindrical portion 48B that extends from the first radial portion 48A and is approximately parallel to the axial direction of the secondary shaft 33, a second radial portion 48C that slopes from the cylindrical portion 48B to the back surface of the movable sheave 46 and extends in the outward radial direction of the secondary shaft 33, and a third radial portion 48D that extends from the second radial portion 48C to the outward radial direction of the secondary shaft 33. A cylinder chamber 80 is formed between the cylinder member 48 and the back surface of the movable sheave 46.

A seal member 81 that slidably abuts on the inner circumferential surface of the outer cylinder 46C of the movable sheave 46 is fitted into the outer edge portion of the third radial portion 48D of the cylinder member 48. When the movable sheave 46 transfers along the axial direction of the secondary shaft 33, the third radial portion 48D is configured to slide along the inner circumferential surface of the outer cylinder 46C of the movable sheave 46 via the seal member 81.

In the above configuration, the operational oil is supplied from the hydraulic circuit of the clamping pressure control device into the cylinder chamber 80 via the oil paths 77 and 78 so as to control operational oil pressure in the cylinder chamber 80. The movable sheave 46 is transferred with respect to the stationary sheave 45 so as to change the winding radius of the belt 49, whereby obtaining predetermined belt clamping pressure.

A spring (compression coil spring) 82 is accommodated in the cylinder chamber 80. The spring 82 abuts on the cylinder member 48 with one end portion thereof and abuts on the movable sheave 46 with the other end portion thereof. Further, the movable sheave 46 is pressed against the side of the stationary sheave 45 by the elastic force of the spring 82 so as to provide an initial thrust for the belt 49.

Also, an inner end edge of the cylinder member 48 is held between a sleeve 79, which is fitted with the outer circumferential portion of the secondary shaft 33, and a step portion 33a of the secondary shaft 33. The cylinder member 48 is positioned and fixed on the secondary shaft 33 by means of the sleeve 79 and the step portion 33a.

Next, distinctive features of the belt type continuously variable transmission 10 in this example will be described with reference to FIGS. 2 and 3.

First, in this example, a boss portion 100 is integrally formed with the stationary sheave 45 of the secondary pulley 39. The boss portion 100 is a cylindrically shaped member that protrudes from the outer circumferential portion of the stationary sheave 45 to the axial direction, toward the opposite side of the movable sheave 46 (the side of the transaxle rear cover 7). The axis of the boss portion 100 corresponds with that of the stationary sheave 45 (the axis of the secondary shaft 33).

The parking gear 50 is integrally formed on the outer circumferential side of the boss portion 100. The internal diameter of the boss portion 100 is processed into a size that corresponds to the external diameter of the outer race 361 of the bearing 36 (for example, a size such that the outer circumferential surface of the outer race 361 is clearance-fitted). The bearing 36 is disposed at the inner circumferential portion 110 of the boss portion 100 (inner circumferential portion of the parking gear 50). There is formed a circular positioning surface 101 to regulate the position of the axial direction of the outer race 361 of the bearing 36 at an inner circumferential edge (the circumferential edge of a base end portion) of the boss portion 100.

A ring groove 102 for a snap ring is provided at an approximately central portion in the axial direction of the inner circumferential surface of the boss portion 100. Also, a ring groove 361a for a snap ring is provided at a central portion in the axial direction of the outer circumferential surface of the outer race 361 of the bearing 36. The outer race 361 is fitted into the inner circumferential portion 110 of the boss portion 100. While a side-end surface 361b of the outer race 361 is placed on the positioning surface 101, it is configured such that the ring groove 361a of the outer circumferential surface of the outer race 361 corresponds with the ring groove 102 of the inner circumferential surface of the boss portion 100. Then, a snap ring 201 (see FIG. 4) is fitted into the ring groove 102 of the boss portion 100 and the ring groove 361a of the outer race 361 according to procedures described later, whereby regulating the transfer of the outer race 361 (bearing 36) in the axial direction (transfer with respect to the boss portion 100).

In contrast, as for the transaxle rear cover 7, a bearing holder 107 is integrally formed in a portion that is opposite to the stationary sheave 45 of the secondary pulley 39. The bearing holder 107 is a cylindrically shaped member that protrudes toward the stationary sheave 45. The axis of the hearing holder 107 corresponds with that of the stationary sheave 45 (the axis of the secondary shaft 33).

The external diameter of the bearing holder 107 is processed into a size that corresponds to the internal diameter of an inner race 362 of the bearing 36 (for example, a size such that the inner circumferential surface of the inner race 362 is clearance-fitted). The bearing 36 is disposed at the outer circumferential portion of the bearing holder 107. There is formed a circular positioning surface 171 to regulate the position of the axial direction of the inner race 362 of the bearing 36 at a circumferential edge of a base end portion of the bearing holder 107.

A ring groove 172 for a snap ring is provided at the outer circumferential surface of the bearing holder 107. Also, a ring groove 362a for the snap ring is provided at a central portion in the axial direction of the inner circumferential surface of the inner race 362 of the bearing 36. The inner race 362 is fitted into the outer circumferential portion of the bearing holder 107. While a side-end surface 362b of the inner race 362 is placed on the positioning surface 171, it is configured such that the ring groove 362a of the inner circumferential surface of the inner race 362 corresponds with the ring groove 172 of the outer circumferential surface of the bearing holder 107. Then, a snap ring 202 (see FIG. 4) is fitted into the ring groove 172 of the bearing holder 107 and the ring groove 362a of the inner race 362 according to procedures described later, whereby regulating the transfer of the inner race 362 (bearing 36) in the axial direction (transfer with respect to the bearing holder 107).

Figure 3:
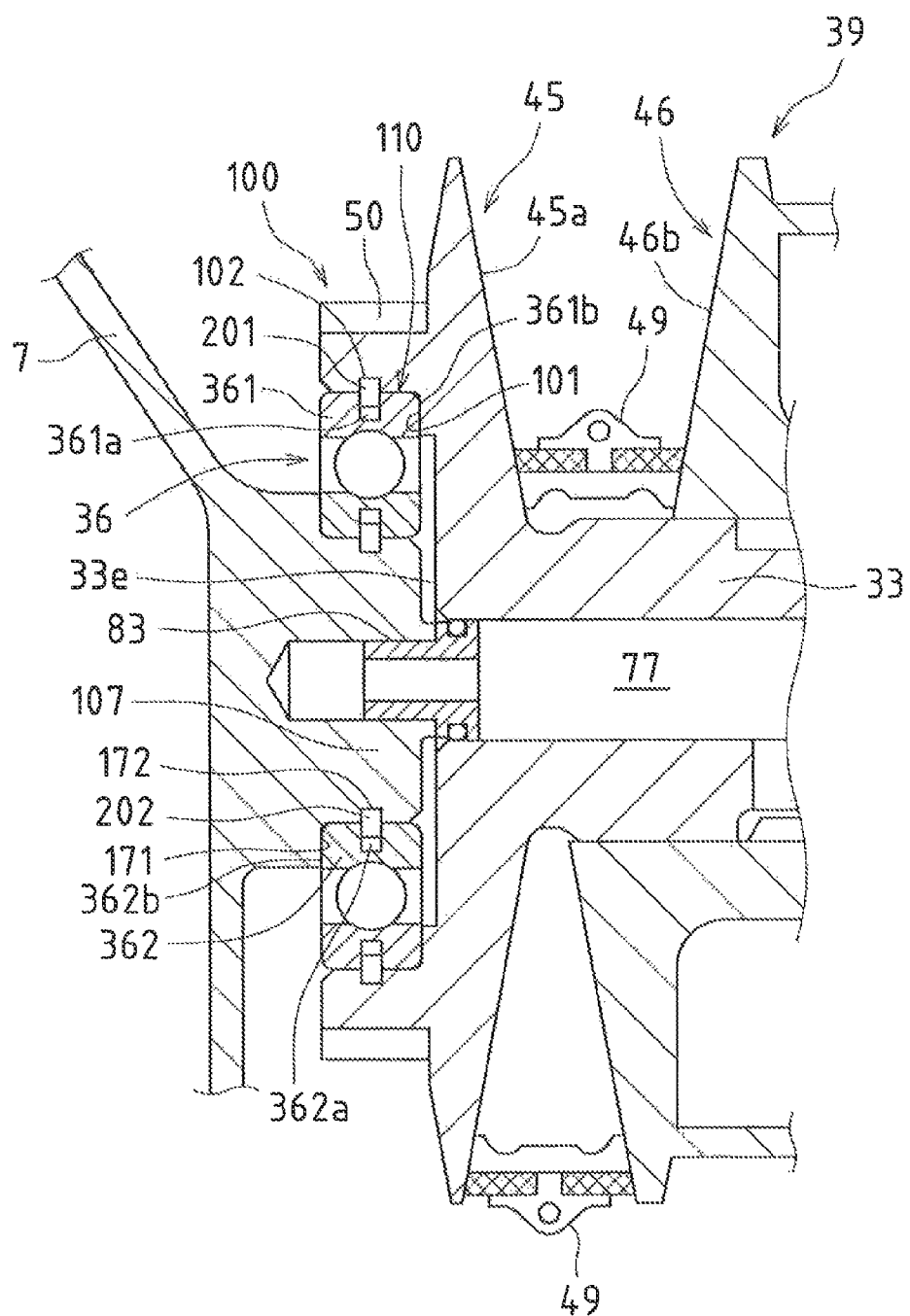
FIG. 3 is a partial enlarged view of a secondary pulley of the belt type continuously variable transmission of FIG. 2 and its peripheral portion.

Then, with respect to the belt type continuously variable transmission 10 of this example, as shown in FIGS. 2 and 3, it is characterized such that the outer circumferential surface of the outer race 361 of the bearing 36 abuts on the inner circumferential surface of the boss portion 100, and the stationary sheave 45 of the secondary pulley 39 is supported by the bearing 36 via the boss portion 100.

Procedure for Fitting Snap Ring

Next, a procedure for fitting a snap ring will be described with reference to FIGS. 5 and 6.

First, one example of the procedure for fitting the snap ring 201 into the ring groove 361a of the outer race 361 of the bearing 36 and the ring groove 102 of the boss portion 100 will be described with reference to FIG. 5.

Figure 4:
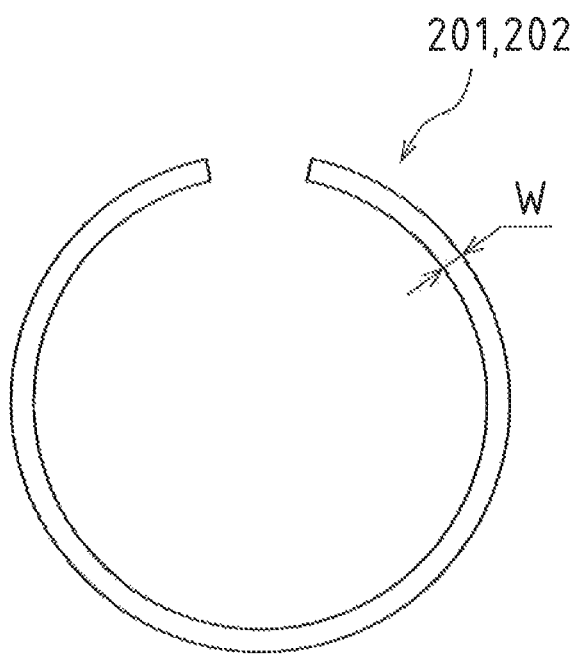
FIG. 4 is a front view of a snap ring schematically illustrated as one example.
Figure 5:
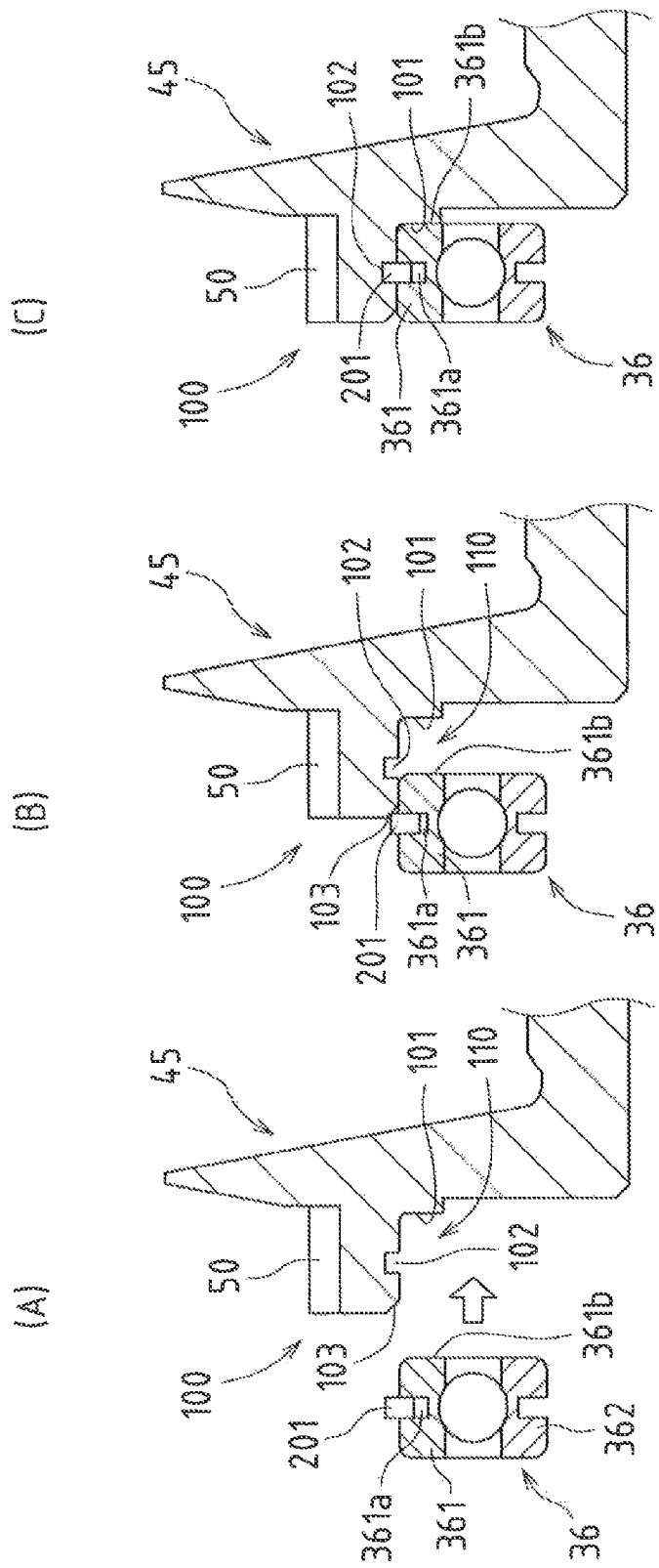
FIG. 5 is an explanatory diagram of a procedure for fitting the snap ring to a ring groove of an outer race of a bearing and a ring groove of a boss portion of a stationary sheave as one example.

In the example shown in FIG. 5, a groove depth of the ring groove 361a of the outer race 361 is processed deeper than a width (width in the radial direction) W of the snap ring 201 shown in FIG. 4, and the outer race 361 (bearing 36) is fitted into the inner circumferential portion 110 of the boss portion 100 while the snap ring 201 is fitted into the ring groove 361a of the outer race 361 (FIG. 5A). While the snap ring 201 is reduced in the radial direction (contracted in diameter) with a conical tapered surface 103 of a tip end portion of the boss portion 100, the outer race 361 is thrust into the inner circumferential portion 110 (FIG. 5B). Then, when the side-end surface 361b of the outer race 361 abuts on the positioning surface 101, that is, when the ring groove 361a of the outer race 361 corresponds with the ring groove 102 of the boss portion 100 (FIG. 5C), the snap ring 201 that has been contracted in diameter expands in diameter with a restoring force so as to fit the snap ring 201 into the ring groove 102 of the boss portion 100. In this manner, the snap ring 201 can be fitted into the ring groove 361a of the outer race 361 and the ring groove 102 of the boss portion 100.

Contrary to the form shown in FIG. 5, it is noted that the snap ring 201 may be attached in the following procedure; a groove depth of the ring groove 102 of the boss portion 100 is processed deeper than the width (width in the radial direction) W of the snap ring 201, and the outer race 361 is fitted into the inner circumferential portion 110 of the boss portion 100 while the snap ring 201 is fitted into the ring groove 102 of the boss portion 100; and while the snap ring 201 is expanded in diameter with an end portion of the outer race 361 (a tapered surface or a rounded surface), the outer race 361 is thrust into the inner circumferential portion 110 so as to fit the snap ring 201 into the ring groove 361a of the outer race 361.

Next, one example of a procedure for fitting the snap ring 202 into the ring groove 362a of the inner race 362 of the bearing 36 and the ring groove 172 of the bearing holder 107 will be described with reference to FIG. 6.

Figure 6:
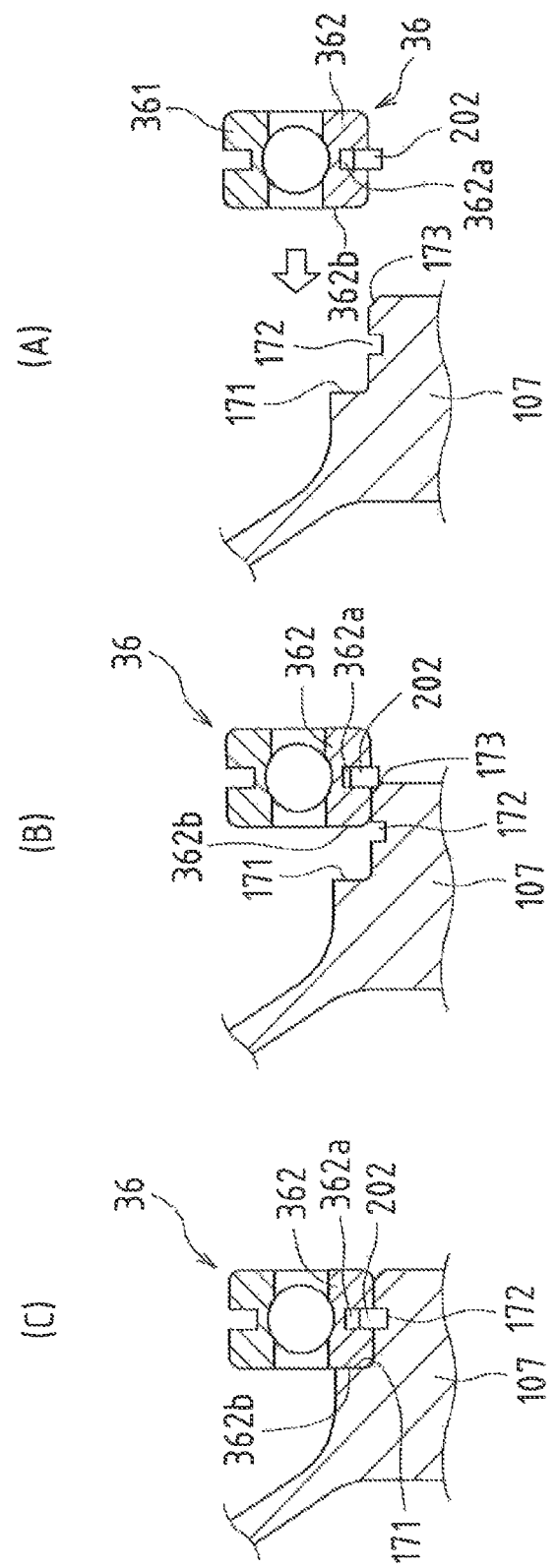
FIG. 6 is an explanatory diagram of a procedure for fitting the snap ring to a ring groove of an inner race of the bearing and a ring groove of a bearing holder.

In the example shown in FIG. 6, a groove depth of the ring groove 362a of the inner race 362 is processed deeper than a width (width in the radial direction) W of the snap ring 202 shown in FIG. 4, and the inner race 362 (bearing 36) is fitted into the outer circumferential portion of the bearing holder 107 while the snap ring 202 is fitted into the ring groove 362a of the inner race 362 (FIG. 6A). While the snap ring 202 is expanded in the radial direction (expanded in diameter) with a conical tapered surface 173 of a tip end portion of the bearing holder 107, the inner race 362 is thrust into the outer circumferential portion (FIG. 6B). Then, when the side-end surface 362b of the inner race 362 abuts on the positioning surface 171, that is, when the ring groove 362a of the inner race 362 corresponds with the ring groove 172 of the bearing holder 107 (FIG. 6C), the snap ring 202 that has been expanded in diameter is contracted in diameter with a restoring force so as to fit the snap ring 202 into the ring groove 172 of the bearing holder 107. In this manner, the snap ring 202 can be fitted into the ring groove 362a of the inner race 362 and the ring groove 172 of the bearing holder 107.

Contrary to the form shown in FIG. 6, it is noted that the snap ring 202 may be attached in the following procedure; a groove depth of the ring groove 172 of the bearing holder 107 is processed deeper than the width (width in the radial direction) W of the snap ring 202, and the inner race 362 is fitted into the outer circumferential portion of the bearing holder 107 while the snap ring 202 is fitted into the ring groove 172 of the bearing holder 107; and while the snap ring 202 is contracted in diameter with an end portion of the inner race 362 (a tapered surface or a rounded surface), the inner race 362 is thrust into the outer circumferential portion so as to fit the snap ring 202 into the ring groove 362a of the inner race 362.

Figure 9:
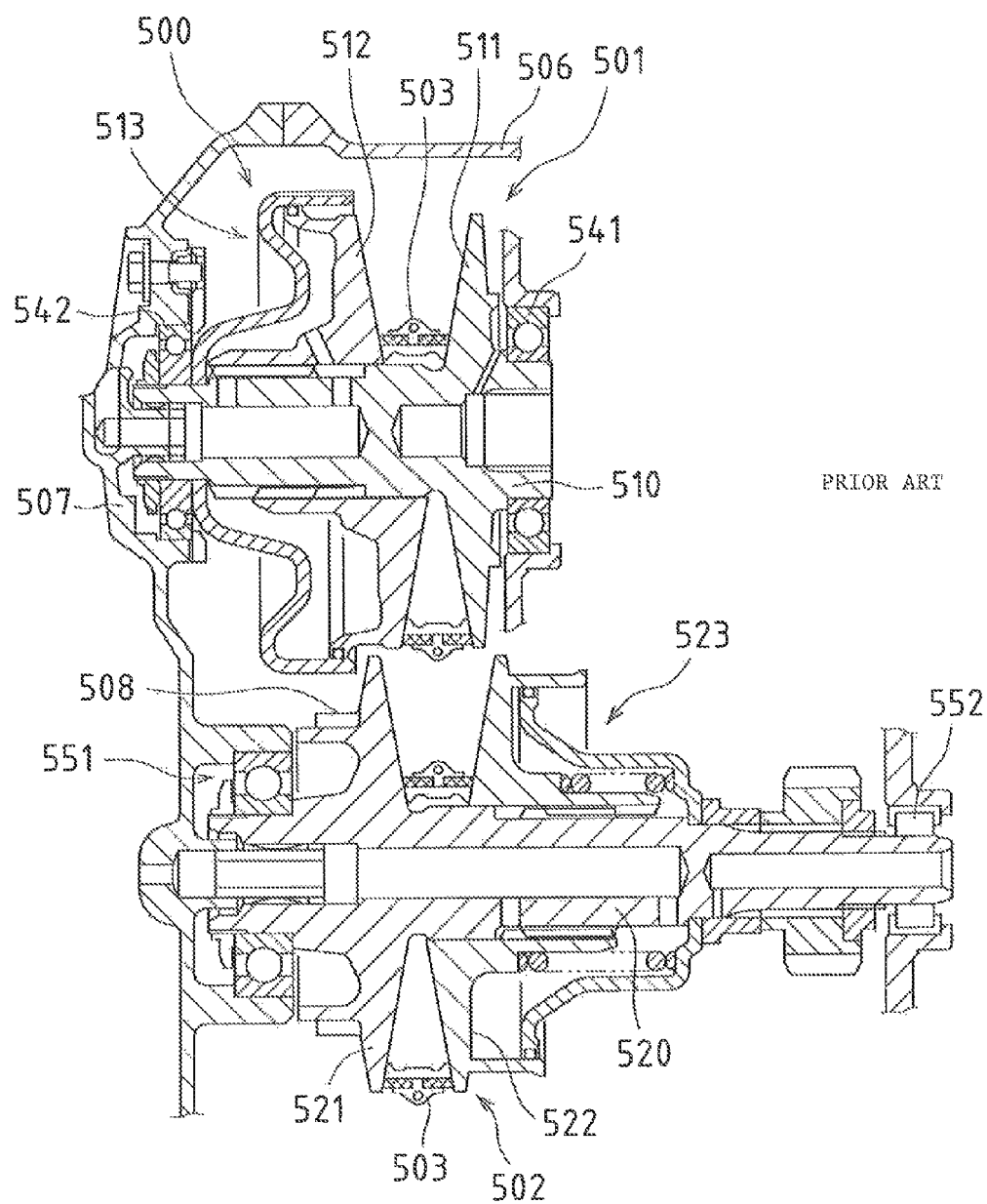
FIG. 9 is a cross-sectional view of a main part of a conventional belt type continuously variable transmission.

As has been described hereinbefore, according to the belt type continuously variable transmission 10 of this example, it is configured to hold the bearing 36 with the inner circumferential portion 110 of the boss portion 100 integrally formed with the stationary sheave 45 of the secondary pulley 39, that is, the inner circumferential portion of the parking gear 50, so that the parking gear 50 and the bearing 36 can be longitudinally arranged (arranged in a direction crossing at right angle with the secondary shaft 33), and the axial length of the secondary shaft 33 can be shortened. That is, in the belt type continuously variable transmission 10 in this example, as shown in FIG. 3, the stationary sheave 45 of the secondary pulley 39 is supported by the bearing 36 via the boss portion 100, whereby limiting the length of the secondary shaft 33 up to an end surface 33e of the stationary sheave 45 and eliminating the need for a shaft whose length exceeds the end surface 33e of the stationary sheave 45. Accordingly, the axial length of the secondary shaft 33 can be substantially shortened, compared with the case of the belt type continuously variable transmission 500 in FIG. 9.

Moreover, according to the belt type continuously variable transmission 10 of this example, the outer race 361 of the bearing 36 is disposed on the outer circumferential portion of the sheave surface (slant on which the belt 49 abuts) 45a of the stationary sheave 45 of the secondary pulley 39, whereby increasing rigidity against the tilt of the sheave surface 45a. Accordingly, the rigidity (sheave thickness) of the stationary sheave can be decreased, compared with that of the conventional one (the conventional belt type continuously variable transmission shown in FIG. 9), so that the axial length can be shortened as much.

Thus, according to the belt type continuously variable transmission 10 of this example, the entire length (axial length) of the secondary shaft 33 can be shortened, so that the drastic cost reduction can be achieved.

Other Embodiments

Other embodiments of the belt type continuously variable transmission of the present invention will be described with reference with FIGS. 7 and 8. These other embodiments (a second embodiment and a third embodiment) are different from the first embodiment described above in terms of a form in which the transfer of the outer race 361 of the bearing 36 that supports the stationary sheave 45 of the secondary pulley 39 is regulated, but the configuration of the other embodiments is similar to that of the first embodiment except for the difference described above.

Second Embodiment

Figure 7:
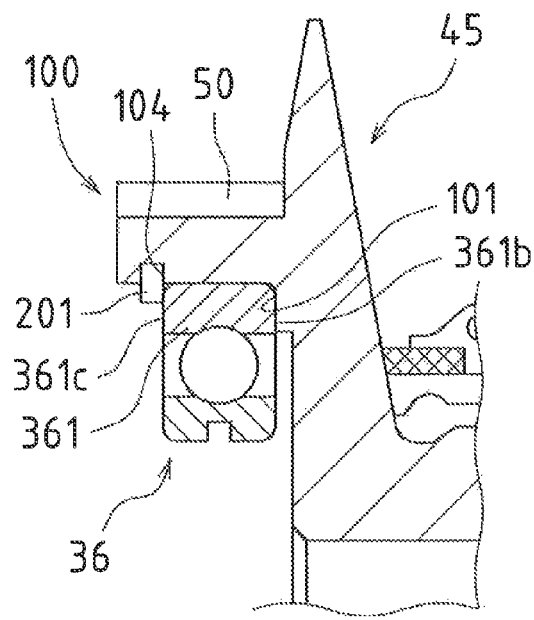
FIG. 7 is a cross-sectional view of the configuration to regulate the transfer of the bearing (outer race) with respect to the boss portion of the stationary sheave as one example.

In the example shown in FIG. 7, the length of the boss portion 100 is extended in the axial direction (extended longer than that of the form of FIG. 3), and a ring groove 104 for a snap ring is formed at a position that corresponds to a side-end surface 361c of the outer race 361 on the inner circumferential surface of the boss portion 100 (surface on the opposite side with respect to the side-end surface 361b that abuts on the positioning surface 101 of the boss portion 100). The snap ring 201 is fitted into the ring groove 104, and the snap ring 201 is placed on the side-end surface 361c of the outer race

361 so as to regulate the transfer of the outer race 361 in the axial direction with respect to the boss portion 100. It is noted that the configuration to regulate the transfer of the inner race 362 with respect to the hearing holder 107 is similar to that of the first embodiment described above.

Third Embodiment

Figure 8:
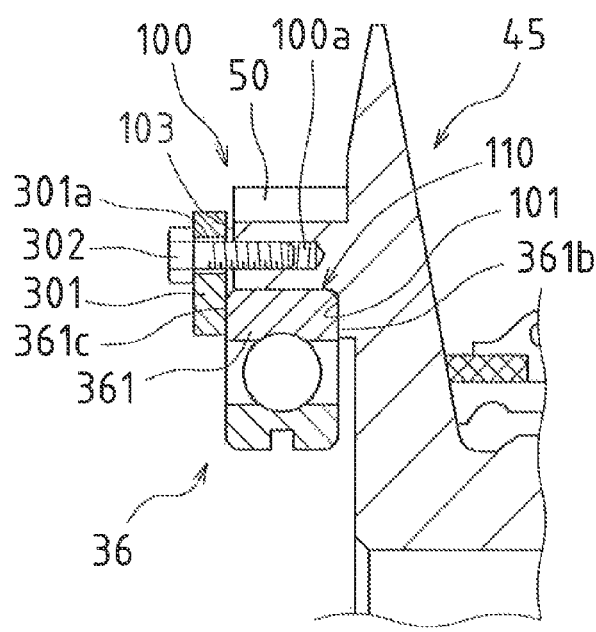
FIG. 8 is a cross-sectional view of the configuration to regulate the transfer of the bearing (outer race) with respect to the boss portion of the stationary sheave as another example.

In the example shown in FIG. 8, the transfer of the outer race 361 with respect to the boss portion 100 is regulated by a stopper plate 301 fixed on the boss portion 100.

Specifically, a female screw hole 100*a* that extends in the axial direction from a tip end surface 103 of the boss portion 100 (the side of the stationary sheave 45) is formed in the boss portion 100. Also, the stopper plate 301 including a bolt inserting hole 301*a* is manufactured. Then, the outer race 361 is fitted into the inner circumferential portion 110 of the boss portion 100. While the stopper plate 301 is placed on the side-end surface 361*c* of the outer race 361 (surface on the opposite side with respect to the side-end surface 361*b* that abuts on the positioning surface 101 of the boss portion 100), the stopper plate 301 is fastened with a bolt 302 with respect to the boss portion 100 so as to regulate the transfer of the outer race 361 in the axial direction with respect to the boss portion 100. It is noted that, as is the same with this example, the configuration to regulate the transfer of the inner race 362 with respect to the hearing holder 107 is similar to that of the first embodiment described above.

It is noted that each embodiment above describes the example in which the present invention is applied to the belt type continuously variable transmission for vehicles, but the present invention is not limited to this and can be applied to a belt type continuously variable transmission used for various purposes other than vehicles.

INDUSTRIAL APPLICABILITY

The present invention finds applications in a belt type continuously variable transmission mounted in a vehicle, and the like, more particularly, the present invention can be effectively used for a belt type continuously variable transmission in which a belt is wound around between a primary pulley and a secondary pulley, each of which includes a stationary sheave and a movable sheave, and a transmission ratio is continuously adjusted by forwardly and backwardly moving the movable sheave with respect to the stationary sheave.

DESCRIPTION OF REFERENCE NUMERAL

10 Belt type continuously variable transmission
32 Primary shaft
33 Secondary shaft
36 Bearing
361 Outer race
361*a* Ring groove
362 Inner race
362*a* Ring groove
38 Primary pulley
39 Secondary pulley
43 Cylinder member (hydraulic actuator)
45 Stationary sheave (secondary pulley)
46 Movable sheave (secondary pulley)
45*a* Sheave surface
42, 47 Pulley groove
48 Cylinder member (hydraulic actuator)
49 Belt
50 Parking gear
100 Boss portion
110 Inner circumferential portion of boss portion
101 Positioning surface
102 Ring groove
103 Conical tapered surface
107 Bearing holder
171 Positioning surface
172 Ring groove
201, 202 Snap ring
301 Stopper plate

The invention claimed is:

1. A belt type continuously variable transmission in which a belt is wound around between a primary pulley and a secondary pulley, each of which includes a stationary sheave and a movable sheave, and a rotational force of the primary pulley on a drive side can be transmitted to the secondary pulley on a driven side via the belt, and a winding position of the belt in a radial direction of each pulley is varied by forwardly and backwardly moving the movable sheave with respect to the stationary sheave so as to adjust a transmission ratio, the belt type continuously variable transmission comprising:
    a bearing configured to rotatably support the stationary sheave of the secondary pulley,
    wherein the stationary sheave of the secondary pulley includes a boss portion that protrudes in an axial direction thereof, and
    a parking gear is provided on an outer circumferential side of the boss portion, and
    an outer race of the bearing is provided so as to abut on an inner circumferential side of the boss portion.

2. The belt type continuously variable transmission according to claim 1,
    wherein a transfer of the bearing in the axial direction is regulated by a snap ring.

3. The belt type continuously variable transmission according to claim 1,
    wherein a position of the bearing in the axial direction is regulated by a stopper plate fixed on the boss portion.

* * * * *